US011674089B2

(12) United States Patent
O'Neill et al.

(10) Patent No.: US 11,674,089 B2
(45) Date of Patent: Jun. 13, 2023

(54) OLEFIN METHYLATION FOR PRODUCTION OF LOW AROMATIC GASOLINE

(71) Applicant: ExxonMobil Technology and Engineering Company, Annandale, NJ (US)

(72) Inventors: Brandon J. O'Neill, Lebanon, NJ (US); Mark A. Deimund, Jersey City, NJ (US); Ajit B. Dandekar, Spring, TX (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 17/014,999

(22) Filed: Sep. 8, 2020

(65) Prior Publication Data

US 2021/0087474 A1   Mar. 25, 2021

Related U.S. Application Data

(60) Provisional application No. 62/904,939, filed on Sep. 24, 2019.

(51) Int. Cl.
*C10G 3/00* (2006.01)
*B01J 29/70* (2006.01)

(52) U.S. Cl.
CPC .............. *C10G 3/49* (2013.01); *B01J 29/703* (2013.01); *B01J 29/7038* (2013.01); *C10G 2300/1088* (2013.01); *C10G 2300/4006* (2013.01)

(58) Field of Classification Search
CPC .................................... C10G 3/44; C10G 3/49
See application file for complete search history.

(56) References Cited

U.S. PATENT DOCUMENTS

| | | | |
|---|---|---|---|
| 3,354,078 A | 11/1967 | Miale et al. | |
| 4,582,815 A | 4/1986 | Bowes | |
| 9,090,525 B2 | 7/2015 | Brown | |
| 9,714,387 B2 | 7/2017 | Hensley et al. | |
| 2010/0240938 A1 | 9/2010 | Daniel et al. | |
| 2015/0175897 A1* | 6/2015 | Loveless | B01J 29/405 585/408 |
| 2018/0155631 A1 | 6/2018 | O'Neill et al. | |

(Continued)

OTHER PUBLICATIONS

Weisz, et al; "Superactive Crystalline Aluminosilicate Hydrocarbon Catalysts"; Journal of Catalysis, 1965, vol. 4, p. 527.

(Continued)

*Primary Examiner* — Renee Robinson
(74) *Attorney, Agent, or Firm* — Shook, Hardy & Bacon L.L.P.

(57) ABSTRACT

Systems and methods are provided for conversion of a combined feed of oxygenates (such as methanol or dimethyl ether) and olefins to a high octane naphtha boiling range product with a reduced or minimized aromatics content. The oxygenate conversion can be performed under conditions that reduce or minimize hydrogen transfer. Optionally, a catalyst that further facilitates formation of branched paraffins can be used, such as a catalyst that has some type of 12-member ring site available on the catalyst surface.

14 Claims, 1 Drawing Sheet

(56) References Cited

U.S. PATENT DOCUMENTS

2018/0170823 A1* 6/2018 Rajagopalan ......... C07C 43/043

OTHER PUBLICATIONS

Miale, et al; "Catalysis by Crystalline Aluminosilicates IV. Attainable Catalytic Cracking Rate Constants, and Superactivity"; Journal of Catalysis, 1966, vol. 6 p. 278.
Olson, et al; "Chemical and Physical Properties of the ZSM-5 Substitutional Series", Journal of Catalysis, 1980, vol. 31, p. 395.

* cited by examiner

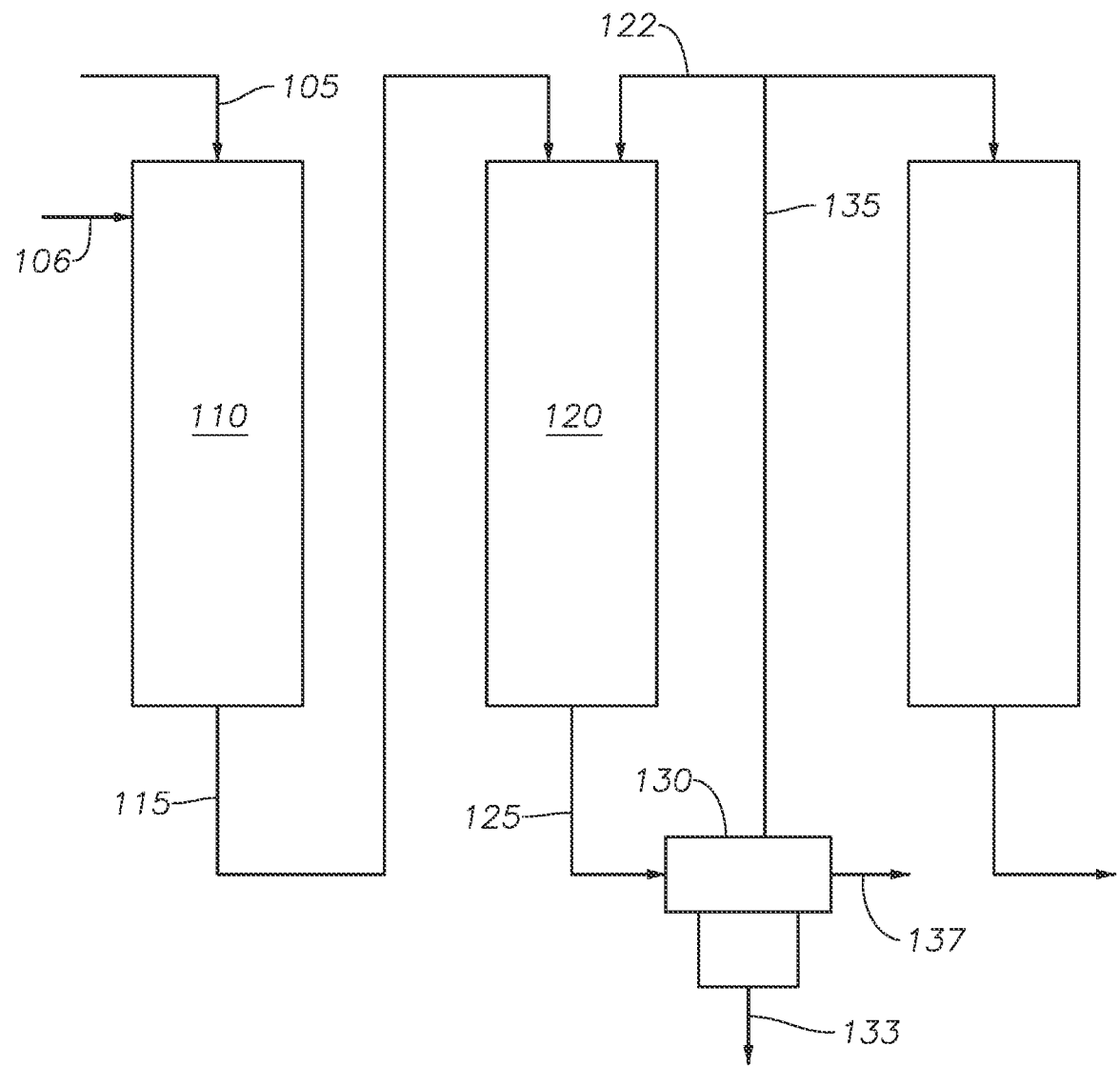

OLEFIN METHYLATION FOR PRODUCTION OF LOW AROMATIC GASOLINE

This application claims priority to U.S. Provisional Application Ser. No. 62/904,939 filed Sep. 24, 2019, which is herein incorporated by reference in its entirety.

FIELD

Field

This invention relates to integrated processes for forming naphtha boiling range products with octane suitable for use in gasoline while having a reduced or minimized content of aromatics.

Background

A variety of industrial processes are known for conversion of low boiling carbon-containing compounds to higher value products. For example, methanol to gasoline (MTG) is a commercial process that produces gasoline from methanol using ZSM-5 catalysts. In the MTG process, methanol is first dehydrated to dimethyl ether. The methanol and/or dimethyl ether then react in a series of reactions that result in formation of aromatic, paraffinic, and olefinic compounds. The resulting product consists of liquefied petroleum gas (LPG) and a high-quality gasoline comprised of aromatics, paraffins, and olefins. The typical MTG hydrocarbon product consists of 40-50% aromatics plus olefins and 50-60% paraffins.

One difficulty with conventional processes for conversion of methanol to gasoline is that the resulting naphtha fraction used to form the gasoline includes a substantial portion of aromatics. While aromatics are beneficial for increasing the octane of a naphtha fraction, an increasing number of countries are passing or proposing regulations to limit the aromatics content of automotive gasoline. By contrast, although low aromatic gasoline is desirable, paraffins and olefins in the naphtha boiling range typically have octane values below 80, unless the paraffins and/or olefins are highly branched. It would be desirable to have improved systems and methods for conversion of methanol to naphtha with a suitable octane for use in gasoline while also having a reduced or minimized aromatic content.

U.S. Pat. No. 9,090,525 describes conversion of oxygenates in the presence of a zeolitic catalyst to form naphtha boiling range compounds with increased octane. A portion of the naphtha boiling range olefins from an initial conversion product are recycled to the oxygenate conversion process to allow for formation of heavier naphtha boiling range compounds, including aromatics.

U. S. Patent Application Publication 2018/0155631 describes a method for combined olefin and oxygenate conversion for aromatics production. Addition of olefins to the feed is described as being beneficial for improving aromatic selectivity and/or for improving the lifetime of the catalyst used for aromatic production.

U.S. Patent Application Publication 2010/0240938 describes catalysts and methods for forming triptane or triptene. The triptane or triptene is formed using an alcohol feed. Optionally, the alcohol can be formed in-situ by synthesizing the alcohol from synthesis gas. The yield of triptane and/or triptene is on the order of 0.5 wt % to 5.0 wt %, relative to a weight of the feed.

SUMMARY OF THE INVENTION

In some aspects, a method for forming a naphtha composition is provided. The method includes exposing a feed comprising oxygenates and olefins to a conversion catalyst at an average reaction temperature of 230° C. to 300° C., a total pressure of 1 psig (~7 kPa-g) to 400 psig (~2700 kPa-g), and an oxygenate weight hourly space velocity of 0.1 $hr^{-1}$ to 10.0 $hr^{-1}$, to form a converted effluent. The converted effluent can include a net yield of 10 wt % or more of a $C_{5+}$ fraction relative to a combined weight of the oxygenates and olefins. The $C_{5+}$ fraction can include 15 wt % or less aromatics, relative to a weight of the $C_{5+}$ fraction, and/or can have a research octane number (RON) of 80 or more. The feed can include a molar ratio of oxygenates to olefins of 1 to 20.

In some aspects, an oxygenate conversion effluent is provided. The oxygenate conversion effluent can include 10 wt % or more of a $C_{5+}$ fraction. The $C_{5+}$ fraction can include 15 wt % or less aromatics, relative to a weight of the $C_{5+}$ fraction, and/or a research octane number (RON) of 80 or more.

BRIEF DESCRIPTION OF THE DRAWINGS

The FIGURE schematically shows an example of a reaction system for conversion of oxygenates to olefins.

DETAILED DESCRIPTION

In various aspects, systems and methods are provided for conversion of a combined feed of oxygenates (such as methanol or dimethyl ether) and olefins to a high octane naphtha boiling range product with a reduced or minimized aromatics content. Instead of performing the oxygenate conversion under conditions where increasing hydrogen transfer is desirable to create additional aromatics, the oxygenate conversion can be performed under conditions that reduce or minimize hydrogen transfer. This can include performing the conversion at temperatures that are conventionally not considered suitable for oxygenate conversion. Additionally, a catalyst that further facilitates formation of branched paraffins can be used, such as a catalyst that has some type of 12-member ring site available on the catalyst surface. Without being bound by any particular theory, it is believed that the conditions described herein can produce $C_{5+}$ fractions (and in particular naphtha boiling range fractions) with increased research octane number but reduced or minimized aromatics, wherein the $C_{5+}$ fractions include an increased content of branched paraffins and/or olefins. Such branched paraffins and/or olefins can include paraffins and/ or olefins with 2 or more branches, or 3 or more branches. Optionally but preferably, the yield of naphtha boiling range components under the low hydrogen transfer conditions can be increased by using olefins as part of the oxygenate feed, such as light olefins recycled from the conversion effluent. In addition to improving yield, addition of olefins to the feed can reduce or minimize formation of coke on the conversion catalyst.

Natural gas, coal, and/or biomass are becoming increasingly important sources of carbon for use in production of fuel and/or lubricant products. A first step in conversion of carbon from a natural gas, coal, and/or biomass source can be a conversion of methane to methanol. Once methanol is formed, various fixed bed, fluid bed, and moving bed processes can be used to convert methanol to higher value products, such as fuels, aromatics, and/or olefins. Conventionally, such processes can use catalysts such as MFI framework (ZSM-5) zeolitic catalysts to form naphtha boiling range and distillate boiling range compounds that include substantial amounts of aromatics.

While aromatic naphtha fractions typically have a desirable octane number (research octane number and/or motor octane number), there are practical limits as well as regulatory limits on the amount of aromatics in motor gasoline. As a result, it would be desirable to be able to make high octane naphtha from oxygenate sources without requiring elevated aromatics content. A naphtha boiling range fraction with a reduced or minimized aromatics content can correspond to a naphtha fraction with an aromatics content of 10 wt % or less, or 8.0 wt % or less, or 5.0 wt % or less, such as down to 0.1 wt % or possibly still lower.

In this discussion and the claims below, Research Octane Number (RON) is determined according to ASTM D2699.

In this discussion, the naphtha boiling range is defined as 50° F. (~10° C., roughly corresponding to the lowest boiling point of a pentane isomer) to 400° F. (204° C.). The distillate fuel boiling range is defined as 400° F. (204° C.) to 700° F. (371° C.). Compounds ($C_{4-}$) with a boiling point below the naphtha boiling range can be referred to as light ends. It is noted that due to practical consideration during fractionation (or other boiling point based separation) of hydrocarbon-like fractions, a fuel fraction formed according to the methods described herein may have T5 and T95 distillation points corresponding to the above values (or T10 and T90 distillation points), as opposed to having initial/final boiling points corresponding to the above values. While various methods are available for determining boiling point information for a given sample, for the claims below ASTM D86 is a suitable method for determining distillation points (including fractional weight distillation points) for a composition.

Feedstocks and Products—Oxygenate Conversion

In various aspects, catalysts described herein can be used for conversion of oxygenate feeds to aromatics and/or olefins products, such as oxygenates containing at least one $C_1$-$C_4$ alkyl group and/or other oxygenates. Examples of suitable oxygenates include feeds containing methanol, dimethyl ether, $C_1$-$C_4$ alcohols, ethers with $C_1$-$C_4$ alkyl chains, including both asymmetric ethers containing $C_1$-$C_4$ alkyl chains (such as methyl ethyl ether, propyl butyl ether, or methyl propyl ether) and symmetric ethers (such as diethyl ether, dipropyl ether, or dibutyl ether), or combinations thereof. It is noted that oxygenates containing at least one $C_1$-$C_4$ alkyl group are intended to explicitly identify oxygenates having alkyl groups containing 4 carbons or less. Preferably the oxygenate feed can include at least 30 wt % of one or more suitable oxygenates, or at least 50 wt %, or at least 75 wt %, or at least 90 wt %, or at least 95 wt %. Additionally or alternately, the oxygenate feed can include at least 50 wt % methanol, such as at least 75 wt % methanol, or at least 90 wt % methanol, or at least 95 wt % methanol. In particular, the oxygenate feed can include 30 wt % to 100 wt % of oxygenate (or methanol), or 50 wt % to 95 wt %, or 75 wt % to 100 wt %, or 75 wt % to 95 wt %. The oxygenate feed can be derived from any convenient source. For example, the oxygenate feed can be formed by reforming of hydrocarbons in a natural gas feed to form synthesis gas ($H_2$, CO, $CO_2$), and then using the synthesis gas to form methanol (or other alcohols). As another example, a suitable oxygenate feed can include methanol, dimethyl ether, or a combination thereof as the oxygenate.

In addition to oxygenates, in some aspects the feed can also include olefins. In this discussion, the olefins included as part of the feed can correspond to aliphatic olefins that contain 6 carbons or less, so that the olefins are suitable for formation of naphtha boiling range compounds. The olefin portion of the feed can be mixed with the oxygenates prior to entering a reactor for performing oxygenate conversion, or a plurality of streams containing oxygenates and/or olefins can be mixed within a conversion reactor. The feed can include 5 wt % to 40 wt % of olefins (i.e., olefins containing 6 carbons or less), or 5 wt % to 30 wt %, or 10 wt % to 40 wt %, or 10 wt % to 30 wt %. When the conversion is operated under low hydrogen transfer conditions with a catalyst that is selective for formation of paraffins and olefins, the addition of olefins can allow for further production of paraffins and olefins. In aspects where olefins are included in the feed, the molar ratio of oxygenates to olefins can be 20 or less, or 10 or less, or 6.0 or less, or 4.0 or less, such as down to a molar ratio of 1.0. For example, the molar ratio of oxygenates to olefins can be between 1.0 and 20, or between 1.0 and 10, or between 1.0 and 6.0, or between 4.0 and 20, or between 6.0 and 20. It is noted that the weight percent of olefins in the feed can be dependent on the nature of the olefins. For example, if a $C_5$ olefin is used as the olefin with a methanol-containing feed, the wt % of olefin required to achieve a desired molar ratio of olefin to oxygenate will be relatively high due to the much larger molecular weight of a $C_5$ alkene.

In some aspects, the olefins can correspond to olefins generated during the oxygenate conversion process. In such aspects, a portion of the effluent from the conversion process can be recycled to provide olefins for the feed. In other aspects, the olefins can be derived from any other convenient source. The olefin feed can optionally include compounds that act as inerts or act as a diluent in the conversion process. For example, a stream of "waste" olefins having an olefin content of 5 vol % to 20 vol % can be suitable as a source of olefins, so long as the other components of the "waste" olefins stream are compatible with the conversion process. For example, the other components of the olefin stream can correspond to inert gases such as $N_2$, carbon oxides, paraffins, and/or other gases that have low reactivity under the conversion conditions. Water can also be present, although it can be preferable for water to correspond to 20 vol % or less of the total feed, or 10 vol % or less.

In addition to oxygenates and olefins, a feed can also include diluents, such as water (in the form of steam), nitrogen or other inert gases, and/or paraffins or other non-reactive hydrocarbons. In some aspects, the source of olefins can correspond to a low purity source of olefins, so that the source of olefins corresponds to 20 wt % or less of olefins. In some aspects, the portion of the feed corresponding to components different from oxygenates and olefins can correspond to 1 wt % to 60 wt % of the feed, or 1 wt % to 25 wt %, or 10 wt % to 30 wt %, or 20 wt % to 60 wt %. Optionally, the feed can substantially correspond to oxygenates and olefins, so that the content of components different from oxygenates and olefins is 1 wt % or less (such as down to 0 wt %).

In various aspects, the net yield of $C_{5+}$ hydrocarbons in the conversion effluent can be 10 wt % to 40 wt %, or 10 wt % to 30 wt %. The net yield refers to the yield of $C_{5+}$ hydrocarbons in the conversion effluent minus the amount (if any) of $C_{5+}$ alkenes in the feed. For example, when pentene is used as an olefin in the feed, the weight of pentene in the feed is subtracted from the weight of $C_{5+}$ hydrocarbons in the conversion effluent when determining net yield. Additionally or alternately, the yield of light olefins ($C_2$-$C_4$ olefins) can be 1.0 wt % to 15 wt %, or 1.0 wt % to 10 wt %, or 1.0 wt % to 6.0 wt % when using an MRE framework catalyst. For other conversion catalysts, the yield of light olefins can be 0.1 wt % to 10 wt %, or 0.1 wt % to 6.0 wt %.

In various aspects, the yield of aromatics relative to the $C_{5+}$ portion of the hydrocarbon product can be 0.1 wt % to 15 wt %, or 1.0 wt % to 15 wt %, or 0.1 wt % to 10 wt %, or 1 wt % to 10 wt %, or 0.1 wt % to 5.0 wt %. In various aspects, the yield of olefins relative to the $C_{5+}$ portion of the hydrocarbon product can be 5 wt % to 60 wt %, or 20 wt % to 60 wt %, or 25 wt % to 60 wt %, or 5 wt % to 40 wt %, or 20 wt % to 40 wt %, or 25 wt % to 50 wt %. In various aspects, the yield of paraffins relative to the $C_{5+}$ portion of the hydrocarbon product can be 20 wt % to 50 wt %, or 20 wt % to 35 wt %, or 25 wt % to 45 wt %, or 25 wt % to 40 wt %. Additionally or alternately, less than 10 wt % of the total hydrocarbon product can correspond to $C_1$ paraffins (methane).

The total hydrocarbon product in the conversion effluent can include a naphtha boiling range portion, a distillate fuel boiling range portion, and a light ends portion. Optionally but preferably, the conversion effluent can include 1.0 wt % or less of compounds boiling above the naphtha boiling range (204° C.+). In some aspects, higher values for the molar ratio of oxygenates to olefins in the feed can be used to reduce or minimize compounds boiling above the distillate range.

The naphtha boiling range portion formed from a conversion process can have an research octane number of 85 or more, or 87 or more, or 90 or more, or 92 or more, or 94 or more, such as up to 100 or possibly still higher. Research octane number (RON) can be determined according to ASTM D2699.

The conversion conditions can also result in generation of CO and/or $CO_2$. In some aspects, the amount of combined CO, $CO_2$, and $CH_4$ can correspond to 6.0 wt % or less of the total hydrocarbon product in a conversion effluent, or 5.0 wt % or less. In this discussion and the claims below, the amounts of CO and $CO_2$ in a conversion effluent are included when determining the amount of the total hydrocarbon product (such as the weight of the total hydrocarbon product).

Suitable and/or effective conditions for performing a conversion reaction can include average reaction temperatures of 230° C. to 300° C., 230° C. to 290° C., or 250° C. to 300° C., or 230° C. to 280° C., or 270° C. to 300° C.; total pressures between 1 psig (~7 kPag) to 400 psig (~2700 kPag), or 10 psig (~70 kPag) to 150 psig (~1050 kPag), or 10 psig (~70 kPag) to 100 psig (~700 kPag), and an oxygenate space velocity between 0.1 $hr^{-1}$ to 10 $hr^{-1}$ based on weight of oxygenate relative to weight of catalyst (WHSV), or 0.1 $hr^{-1}$ to 5.0 $hr^{-1}$, or 1.0 $hr^{-1}$ to 5.0 $hr^{-1}$. In this discussion, average reaction temperature is defined as the average of the temperature at the reactor inlet and the temperature at the reactor outlet for the reactor where the conversion reaction is performed.

Optionally, a portion of the conversion effluent can be recycled for inclusion as part of the feed to the conversion reactor. For example, at least a portion of the light ends from the conversion effluent can be recycled as part of the feed. The recycled portion of the light ends can correspond to any convenient amount, such as 10 wt % to 90 wt % of the light ends. Recycling of light ends can provide olefins, which can serve as an additional reactant in the conversion reaction, as well as providing a mechanism for temperature control.

Various types of reactors can provide a suitable configuration for performing a conversion reaction. Suitable reactors can include fixed bed reactors (such as trickle bed reactors), moving bed reactors, and fluidized bed reactors (such as riser reactors).

Catalysts for Oxygenate Conversion

In various aspects, a transition metal-enhanced zeolite catalyst composition can be used for conversion of oxygenate feeds to naphtha boiling range fractions and olefins. In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", $6^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, and/or other transition metals that can substitute for silicon and/or aluminum in a zeolitic framework.

A suitable zeolite can include a 1-dimensional or 2-dimensional 10-member ring pore channel network. In some aspects, additional benefits can be achieved if the zeolite also has 12-member ring pockets at the surface, such as MWW framework (e.g., MCM-49, MCM-22). Such pockets represent active sites having a 12-member ring shape, but do not provide access to a pore network. Examples of MWW framework zeolites include MCM-22, MCM-36, MCM-49, MCM-56, EMM-10, EMM-12, EMM-13, and ITQ-2. In some aspects, zeolites with a 1-dimensional or 2-dimensional 12-member ring pore channel network can also be suitable, such as MOR framework zeolites. Examples of suitable zeolites having a 1-dimensional 10-member ring pore channel network include zeolites having a MRE (e.g, ZSM-48), MTW, TON (e.g., ZSM-22), MTT (e.g., ZSM-23), and/or MFS framework. In some aspects, ZSM-48, ZSM-22, MCM-22, MCM-49, or a combination thereof can correspond to preferred zeolites.

Generally, a zeolite having desired activity for methanol conversion can have a silicon to aluminum molar ratio of 5 to 200, or 15 to 100, or 20 to 80, or 20 to 40. For example, the silicon to aluminum ratio can be at least 10, or at least 20, or at least 30, or at least 40, or at least 50, or at least 60. Additionally or alternately, the silicon to aluminum ratio can be 300 or less, or 200 or less, or 100 or less, or 80 or less, or 60 or less, or 50 or less.

Typically, reducing the silicon to aluminum ratio in a zeolite will result in a zeolite with a higher acidity, and therefore higher activity for cracking of hydrocarbon or hydrocarbonaceous feeds, such as petroleum feeds. However, with respect to conversion of oxygenates to aromatics, such increased cracking activity may not be beneficial, and instead may result in increased formation of residual carbon or coke during the conversion reaction. Such residual carbon can deposit on the zeolite catalyst, leading to deactivation of the catalyst over time. Having a silicon to aluminum ratio of at least 40, such as at least 50 or at least 60, can reduce or minimize the amount of additional residual carbon that is formed due to the acidic or cracking activity of a catalyst.

It is noted that the molar ratio described herein is a ratio of silicon to aluminum. If a corresponding ratio of silica to alumina were described, the corresponding ratio of silica (SiO$_2$) to alumina (Al$_2$O$_3$) would be twice as large, due to the presence of two aluminum atoms in each alumina stoichiometric unit. Thus, a silicon to aluminum ratio of 10 corresponds to a silica to alumina ratio of 20.

In some aspects, a zeolite in a catalyst can be present at least partly in the hydrogen form. Depending on the conditions used to synthesize the zeolite, this may correspond to converting the zeolite from, for example, the sodium form. This can readily be achieved, for example, by ion exchange to convert the zeolite to the ammonium form followed by calcination in air or an inert atmosphere at a temperature of 400° C. to 700° C. to convert the ammonium form to the active hydrogen form.

Additionally or alternately, a zeolitic catalyst can include and/or be enhanced by a transition metal. The transition metal can be any convenient transition metal selected from Groups 6-15 of the IUPAC periodic table. The transition metal can be incorporated into the zeolite/catalyst by any convenient method, such as by impregnation, by ion exchange, by mulling prior to extrusion, and/or by any other convenient method. Optionally, the transition metal incorporated into a zeolite/catalyst can correspond to two or more metals. After impregnation or ion exchange, the transition metal-enhanced catalyst can be treated in air or an inert atmosphere at a temperature of 400° C. to 700° C. The amount of transition metal can be expressed as a weight percentage of metal relative to the total weight of the catalyst (including any zeolite and any binder). A catalyst can include 0.05 wt % to 20 wt % of one or more transition metals, or 0.1 wt % to 10 wt %, or 0.1 wt % to 5 wt %, or 0.1 wt % to 2.0 wt %. For example, the amount of transition metal can be at least 0.1 wt % of transition metal, or at least 0.25 wt % of transition metal, or at least 0.5 wt %, or at least 0.75 wt %, or at least 1.0 wt %. Additionally or alternately, the amount of transition metal can be 20 wt % or less, or 10 wt % or less, or 5 wt % or less, or 2.0 wt % or less, or 1.5 wt % or less, or 1.2 wt % or less, or 1.1 wt % or less, or 1.0 wt % or less.

A catalyst composition can employ a zeolite in its original crystalline form or after formulation into catalyst particles, such as by extrusion. A process for producing zeolite extrudates in the absence of a binder is disclosed in, for example, U.S. Pat. No. 4,582,815, the entire contents of which are incorporated herein by reference. Preferably, the transition metal can be incorporated after formulation of the zeolite (such as by extrusion) to form catalyst particles without an added binder. Optionally, such an "unbound" catalyst can be steamed after extrusion. The terms "unbound" is intended to mean that the present catalyst composition is free of any of the inorganic oxide binders, such as alumina or silica, frequently combined with zeolite catalysts to enhance their physical properties.

The catalyst compositions described herein can further be characterized based on activity for hexane cracking, or Alpha value. Alpha value is a measure of the acid activity of a zeolite catalyst as compared with a standard silica-alumina catalyst. The alpha test is described in U.S. Pat. No. 3,354,078; in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395. Higher alpha values correspond with a more active cracking catalyst. For an oxygenate conversion catalyst, Alpha value can be 15 to 150, or 15 to 100, or 15 to 50. Lower Alpha values can be beneficial, as increased acidity can tend to increase hydrogen transfer. In other aspects, such as when the conversion is performed at temperatures of 275° C. or less, or 250° C. or less, catalysts with an Alpha value of 15 to 1000 can be suitable. This is due to the suppression of hydrogen transfer at lower temperatures.

As an alternative to forming catalysts without a separate binder, zeolite crystals can be combined with a binder to form bound catalysts. Suitable binders for zeolite-based catalysts can include various inorganic oxides, such as silica, alumina, zirconia, titania, silica-alumina, cerium oxide, magnesium oxide, yttrium oxide, or combinations thereof. For catalysts including a binder, the catalyst can comprise at least 10 wt % zeolite, or at least 30 wt %, or at least 50 wt %, such as up to 90 wt % or more. Generally, a binder can be present in an amount between 1 wt % and 90 wt %, for example between 5 wt % and 40 wt % of a catalyst composition. In some aspects, the catalyst can include at least 5 wt % binder, such as at least 10 wt %, or at least 20 wt %. Additionally or alternately, the catalyst can include 90 wt % or less of binder, such as 50 wt % or less, or 40 wt % or less, or 35 wt % or less. Combining the zeolite and the binder can generally be achieved, for example, by mulling an aqueous mixture of the zeolite and binder and then extruding the mixture into catalyst pellets. A process for producing zeolite extrudates using a silica binder is disclosed in, for example, U.S. Pat. No. 4,582,815. Optionally, a bound catalyst can be steamed after extrusion.

Example of Reaction System Configuration

The FIGURE shows an example of a reaction system configuration for performing oxygenate conversion to form a naphtha boiling range product. It is noted that the reactors shown in the FIGURE are depicted as fixed bed, downflow reactors (such as trickle-bed reactors) for convenience. It is understood that any or all of the reactors shown in the FIGURE can alternatively be moving bed reactors and/or fluidized bed reactors. In the FIGURE, a feed 105 can correspond to an oxygenate-containing feed. In a particular example, feed 105 can correspond to 96 wt % methanol and 4 wt % water. A second (optional) feed 106 can correspond to an olefin-containing feed. Optionally, oxygenate feed 105 can be introduced into a reactor as a plurality of input flows, such as a first input flow containing a mixture of methanol and water and a second input flow containing a mixture of nitrogen and hydrogen. Optionally, oxygenate feed 105 and olefinic feed 106 can be combined prior to entering the reactor 110.

The feed 105 (or alternatively a combination of oxygenate feed 105 and olefinic feed 106) can optionally be introduced into an initial dehydration reactor 110. Initial dehydration reactor 110 can include an acidic catalyst, such as an acidic alumina catalyst, that can facilitate an equilibrium reaction between methanol, water, and dimethyl ether. This can result in production of an effluent 115 that includes both methanol and dimethyl ether. Those of skill in the art will recognize that dimethyl ether and methanol can often be used in similar manners when performing an oxygenate conversion reaction. The dehydration of methanol to form dimethyl ether is highly exothermic. By performing an initial dehydration, the amount of heat generated in the conversion reactor(s) can be reduced, which can allow for improved temperature control in the conversion reactor. Optionally, a portion of the oxygenate feed 105 can bypass the dehydration reactor and can be input directly into conversion reactor 120. In aspects where other oxygenates are used as a feed, such as C$_{2+}$ alcohols or larger ethers, dehydration reactor can be omitted so that feed 105 (or a combination of oxygenate feed 105 and olefinic feed 106) is an input flow for conversion reactor 120.

The oxygenate feed 105 and olefinic feed 106 (and/or the effluent 115 containing both dimethyl ether and methanol) are then passed into conversion reactor 120. The input to conversion reactor 120 can be exposed to a conversion catalyst under effective conditions for forming a conversion effluent 125. The conversion effluent 125 can then be separated, such as by using a 3 phase separator 130. One phase generated by separator 130 can be an aqueous phase 133 that includes a substantial majority of the water present within the conversion effluent 125. Another phase generated by separator 130 can correspond to a hydrocarbon liquid product 137. The hydrocarbon liquid product can correspond to naphtha boiling range compounds formed during the conversion reaction. Optionally, the hydrocarbon liquid product can include a portion of hydrocarbon-like compounds that include one or more heteroatoms, such as oxygen, sulfur, nitrogen, and/or other heteroatoms that are commonly found in petroleum or bio-derived feeds.

A third phase generated by separator 130 can correspond to a hydrocarbon gas product 135. The hydrocarbon gas product 135 can include $C_{4-}$ compounds corresponding to light paraffins and light olefins. Optionally, a recycle portion 122 of hydrocarbon gas product 135 can be recycled as part of the input flows to conversion reactor 120 and/or dehydration reactor 110. In some configurations where the amount of recycle portion 122 is sufficiently large, a bleed or waste flow (not shown) can also be present to reduce or minimize the build-up of $C_{4-}$ paraffins in conversion reactor 120.

Examples—Conversion of Methanol and 1-Pentene using Zeolitic Catalysts

Various conversion catalysts were tested in an isothermal fixed-bed reactor without recycle. Thus, any yields shown correspond to once-through/single pass yields. It is expected that yields relative to feed can be improved with recycle. The feed included 70 wt % methanol, with an amount of 1-pentene that resulted in a molar ratios of methanol to 1-pentene of 5:1. The feed was exposed to conversion catalyst at temperatures ranging from 250° C. to 300° C., a pressure of 15 psig, and a weight hourly space velocity, relative to weight of the zeolite, of 2 hr$^{-1}$. The conversion catalysts tested corresponded to self-bound catalysts, with the exception of MCM-49, which included 5 wt % of an alumina binder. The zeolites tested included ZSM-48, MCM-49, MCM-22, MCM-56, ZSM-5, a MOR framework zeolite (EMM-34), a BEA framework zeolite, USY, ZSM-11, ZSM-18, ZSM-23, ZSM-35, ZSM-57 and ZSM-22. Some of the catalysts were formulated without a binder (such as ZSM-48 and ZSM-5), while other catalysts included 5 wt % to 25 wt % of an alumina binder (such as MCM-49, BEA, and ZSM-22). The binder was included in the catalysts for ease of formulation, and it is believed that the presence or absence of the binder did not have a substantial impact on activity. The catalysts did not include any additional supported metals or phosphorus.

One of the difficulties with performing oxygenate conversion at low temperatures to reduce hydrogen transfer is that the methanol conversion can be low and the resulting yield of $C_{5+}$ hydrocarbons can be low. At 250° C., the MWW framework zeolites (MCM-49, MCM-22, MCM-56) had a significant conversion and yield advantage at 250° C. relative to the other zeolites that were tested. MCM-49 provided a methanol conversion of up to 40%, with net $C_{5+}$ yields of up to 20 wt % (relative to the total hydrocarbon product).

The results for MCM-22 and MCM-56 were similar. The other catalysts tested had less than 20% methanol conversion, with net $C_{5+}$ yields of 15 wt % or less.

At 275° C., the conversion and $C_{5+}$ yield for ZSM-48 increased to be roughly comparable to the conversion and $C_{5+}$ yield for MCM-49. The catalysts including ZSM-5, ZSM-11, and MOR framework catalyst also had similar conversion and yields at 275° C. By contrast, the BEA framework catalyst had relatively low conversion and $C_{5+}$ yield. The other catalysts tested (USY, ZSM-18, ZSM-23, ZSM-35, ZSM-57 and ZSM-22) also had relatively low conversion and $C_{5+}$ yield.

At 300° C. the ZSM-48 and MOR catalysts had a substantial advantage relative to the other catalysts tested for conversion and $C_{5+}$ yield. ZSM-48 had a conversion of feed of 75 wt % or more with a yield of 35 wt % or more. The MOR catalyst had a conversion of 60 wt % to 70 wt %, with a yield of roughly 30 wt %. MCM-49, ZSM-11, and ZSM-5 all provided conversion of 20 wt % or more of the feed, with yields greater than 10 wt % (and approaching 20 wt % for ZSM-5). The conversion and yield for the BEA catalyst as well as the other catalysts remained low, with conversion amounts of less than 20 wt %.

Based on the testing at 250° C., 275° C., and 300° C., the catalysts based on MCM-49, ZSM-48, and MOR had favorable conversion rates and yields, depending on the temperature. MCM-22 and MCM-56 had comparable results to the MCM-49. ZSM-5 also had a favorable conversion rate. As shown in Tables 1 and 2 below, however, ZSM-5 tends to facilitate formation of aromatics. Based on the testing, BEA and the other catalysts tested had less favorable conversion rates and yields.

Some of the results above are summarized below in Tables 1 and 2. Table 1 shows the net $C_{5+}$ yield at 300° C., 15 psig (~100 kPa-g), and 2 hr$^{-1}$ WHSV for the catalysts based on MCM-49, ZSM-5, BEA, ZSM-48, and the MOR framework catalyst. Table 1 also shows the aromatics selectivity versus the net $C_{5+}$ yield. It is noted that the vertical axis corresponds to selectivity relative to the total hydrocarbon product, so the weight of any unreacted 1-pentene is not removed prior to calculating the aromatic selectivity. Additionally, Table 1 also shows the research octane number (RON) for the $C_{5+}$ fraction.

TABLE 1

Octane of Naphtha Fraction at 300° C.

| | Net $C_{5+}$ Yield (wt %) | Aromatics Yield (wt %) | Aromatics Selectivity (wt % relative to $C_{5+}$ yield) | RON |
|---|---|---|---|---|
| MCM-49 (MWW) | 12 | 1.4 | 12 | 90.9 |
| BEA | 8 | 1.3 | 16 | 87.9 |
| MOR | 27 | 2.1 | 8 | 86.9 |
| ZSM-5 (MFI) | 23 | 4.3 | 19 | 82.0 |
| ZSM-48 (MRE) | 35 | 2.4 | 7 | 83.4 |

As shown in Table 1, the MCM-49 catalyst produced the naphtha ($C_{5+}$) fraction with the highest RON value of more than 90. The RON for ZSM-48 was lower at roughly 83, but with substantially higher $C_{5+}$ yield (~35 wt %) under the single-pass conditions. The MOR framework catalyst provided a relatively high RON of roughly 87 while also providing a higher net $C_{5+}$ yield of 27 wt %. In addition to having the lowest RON value under the low hydrogen transfer conditions, the ZSM-5 catalyst also produced a naphtha fraction with an aromatics selectivity of greater than 15 wt %. The BEA catalyst resulted in a low $C_{5+}$ yield of 8 wt % while also having an aromatics selectivity of greater than 15 wt %.

Table 2 provides similar types of information for the test runs at 250° C.

TABLE 2

Octane of Naphtha Fraction at 250° C.

| | Net $C_{5+}$ Yield (wt %) | Aromatics Selectivity (wt % relative to $C_{5+}$ yield) | RON |
|---|---|---|---|
| MCM-49 (MWW) | 15 | 11 | 94.7 |
| BEA | 5.3 | 19 | 89.6 |
| MOR | 12 | 5 | 92.3 |
| ZSM-5 (MFI) | 6.4 | 42 | 85.3 |
| ZSM-48 (MRE) | 11 | 10 | 86.6 |

As shown in Table 2, both the BEA framework catalyst and ZSM-5 resulted in low net $C_{5+}$ yields with greater than 15 wt % aromatics selectivity. By contrast, ZSM-48 and MCM-49 had similar aromatics selectivity of less than 15 wt %. MOR had an even lower aromatics selectivity of roughly 5 wt %. It is noted that reducing the conversion temperature provided an unexpected increase in RON for the naphtha ($C_{5+}$) fractions for ZSM-48, MOR, and MCM-49, even though the aromatics selectivity for those catalysts remained relatively constant. Also unexpectedly, the net $C_{5+}$ yield for MCM-49 actually increased (or at least was roughly constant) as the temperature was lowered. This is in contrast to the other catalysts tested, where decreasing the temperature to 250° C. resulted in substantial loss of methanol conversion and substantial loss of net yield.

Additional Embodiments

Embodiment 1. A method for forming a naphtha composition, comprising: exposing a feed comprising oxygenates and olefins to a conversion catalyst at an average reaction temperature of 230° C. to 300° C., a total pressure of 1 psig (~7 kPa-g) to 400 psig (~2700 kPa-g), and an oxygenate weight hourly space velocity of 0.1 hr$^{-1}$ to 10.0 hr$^{-1}$, to form a converted effluent comprising a net yield of 10 wt % or more of a $C_{5+}$ fraction relative to a combined weight of the oxygenates and olefins, the $C_{5+}$ fraction comprising 15 wt % or less aromatics, relative to a weight of the $C_{5+}$ fraction, and having a research octane number (RON) of 80 or more, the feed comprising a molar ratio of oxygenates to olefins of 1 to 20.

Embodiment 2. The method of Embodiment 1, wherein the $C_{5+}$ fraction comprises an RON of 85 or more, or 90 or more.

Embodiment 3. The method of any of the above embodiments, wherein the average reaction temperature is 230° C. to 290° C., or wherein the total pressure is 10 psig (70 kPa-g) to 150 psig (1050 kPa-g), or a combination thereof.

Embodiment 4. The method of any of the above embodiments, wherein the conversion catalyst further comprises 0.1 wt % to 3.0 wt % of a transition metal.

Embodiment 5. The method of any of the above embodiments, wherein the conversion catalyst comprises 10 wt % or more of a zeolite having a framework structure of MWW, MRE, MTW, TON, MTT, MFS, or a combination thereof.

Embodiment 6. The method of any of the above embodiments, wherein the conversion catalyst comprises 10 wt % or more of MCM-49, MCM-22, MCM-56, a zeolite having a MWW framework structure, or a combination thereof, or wherein the average reaction temperature is 230° C. to 280° C., or a combination thereof.

Embodiment 7. The method of any of the above embodiments, wherein the conversion catalyst comprises 10 wt % or more of ZSM-48, a zeolite having a MRE framework structure, or a combination thereof, or wherein the average reaction temperature is 250° C. to 300° C., or a combination thereof.

Embodiment 8. The method of any of the above embodiments, wherein the conversion catalyst comprises 10 wt % or more of a zeolite having a MOR framework structure, or wherein the average reaction temperature is 270° C. to 300° C., or a combination thereof.

Embodiment 9. The method of any of the above embodiments, the conversion effluent comprises 1.0 wt % or less of compounds boiling above the naphtha boiling range.

Embodiment 10. The method of any of the above embodiments, wherein the feed comprises a molar ratio of oxygenates to olefins of 1.0 to 10, or wherein the feed comprises a molar ratio of oxygenates to olefins of 4.0 to 20.

Embodiment 11. The method of any of the above embodiments, i) wherein the oxygenate comprises 90 wt % or more of methanol, dimethyl ether, or a combination thereof ii) wherein the feed comprising oxygenates and olefins comprises a first feedstock comprising at least a portion of the oxygenates and a second feedstock comprising at least a portion of the olefins, the first feedstock and the second feedstock being combined after entering a reactor containing the conversion catalyst; or iii) a combination of i) and ii).

Embodiment 12. The method of any of the above embodiments, wherein the feed comprises 30 wt % to 95 wt % of oxygenates, 5 wt % to 40 wt % of olefins, or a combination thereof.

Embodiment 13. The method of any of the above embodiments, wherein the feed comprises at 20 wt % to 60 wt % of components different from oxygenates and olefins.

Embodiment 14. The method of claim 1, wherein the $C_{5+}$ fraction comprising 12 wt % or less aromatics relative to the weight of the $C_{5+}$ fraction, or 10 wt % or less.

Embodiment 15. An oxygenate conversion effluent or a $C_{5+}$ fraction of an oxygenate conversion effluent made according to the method of any of Embodiments 1-14.

All numerical values within the detailed description and the claims herein are modified by "about" or "approximately" the indicated value, and take into account experimental error and variations that would be expected by a person having ordinary skill in the art.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for forming a naphtha composition, comprising:
   exposing a feed comprising oxygenates and olefins to a conversion catalyst at an average reaction temperature of 230° C. to 280° C., a total pressure of 1 psig (~7 kPa-g) to 400 psig (~2700 kPa-g), and an oxygenate weight hourly space velocity of 0.1 hr$^{-1}$ to 10.0 hr$^{-1}$, to form a converted effluent comprising a net yield of 10 wt % or more of a $C_{5+}$ fraction relative to a combined weight of the oxygenates and olefins, the $C_{5+}$ fraction comprising 15 wt % or less aromatics, relative to a weight of the $C_{5+}$ fraction, and having a research octane number (RON) of 80 or more, the feed comprising a molar ratio of oxygenates to olefins of 1 to 20, wherein the conversion catalyst comprises 10 wt % or more of a zeolite having a MOR framework structure.

2. The method of claim 1, wherein the $C_{5+}$ fraction comprises an RON of 85 or more.

3. A method for forming a naphtha composition, comprising:

exposing a feed comprising oxygenates and olefins to a conversion catalyst at an average reaction temperature of 230° C. to 300° C., a total pressure of 1 psig (~7 kPa-g) to 400 psig (~2700 kPa-g), and an oxygenate weight hourly space velocity of 0.1 $hr^{-1}$ to 10.0 $hr^{-1}$, to form a converted effluent comprising a net yield of 10 wt % or more of a $C_{5+}$ fraction relative to a combined weight of the oxygenates and olefins, the $C_{5+}$ fraction comprising 15 wt % or less aromatics, relative to a weight of the $C_{5+}$ fraction, and having a research octane number (RON) of 85 or more, the feed comprising a molar ratio of oxygenates to olefins of 1 to 20, wherein the conversion catalyst comprises 10 wt % or more of a zeolite having a framework structure of MWW, MOR, or a combination thereof.

4. The method of claim 3, wherein the total pressure is 10 psig (70 kPa-g) to 150 psig (1050 kPa-g).

5. The method of claim 3, wherein the conversion catalyst further comprises 0.1 wt % to 3.0 wt % of a transition metal.

6. The method of claim 3, wherein the oxygenate comprises 90 wt % or more of methanol, dimethyl ether, or a combination thereof.

7. The method of claim 3, wherein the conversion effluent comprises 1.0 wt % or less of compounds boiling above the naphtha boiling range.

8. The method of claim 3, wherein the feed comprises a molar ratio of oxygenates to olefins of 1.0 to 10, or wherein the feed comprises a molar ratio of oxygenates to olefins of 4.0 to 20.

9. The method of claim 3, wherein the feed comprising oxygenates and olefins comprises a first feedstock comprising at least a portion of the oxygenates and a second feedstock comprising at least a portion of the olefins, the first feedstock and the second feedstock being combined after entering a reactor containing the conversion catalyst.

10. The method of claim 3, wherein the feed comprises 30 wt % to 95 wt % of oxygenates, 5 wt % to 40 wt % of olefins, or a combination thereof.

11. The method of claim 3, wherein the feed comprises at 20 wt % to 60 wt % of components different from oxygenates and olefins.

12. The method of claim 3, wherein the $C_{5+}$ fraction comprises 12 wt % or less aromatics relative to the weight of the $C_{5+}$ fraction.

13. The method of claim 3, wherein the conversion catalyst comprises 10 wt % or more of MCM-49, MCM-22, MCM-56, a zeolite having a MWW framework structure, or a combination thereof, or wherein the average reaction temperature is 230° C. to 280° C., or a combination thereof.

14. The method of claim 3, wherein the conversion catalyst comprises 10 wt % or more of a zeolite having a MOR framework structure, or wherein the average reaction temperature is 270° C. to 300° C., or a combination thereof.

* * * * *